United States Patent

[11] 3,557,364

[72] Inventor Charles L. Swanton
North Chili, N.Y.
[21] Appl. No. 793,275
[22] Filed Jan. 23, 1969
[45] Patented Jan. 19, 1971
[73] Assignee General Signal Corporation
Rochester, N.Y.
a corporation of New York

[54] TRAILABLE SWITCH MACHINE WITH DUAL CONTROL
11 Claims, 7 Drawing Figs.

[52] U.S. Cl. .................................................. 246/240
[51] Int. Cl. .................................................. B61l 5/00
[50] Field of Search .................................... 246/240, 242

[56] References Cited
UNITED STATES PATENTS
1,846,689 2/1932 O'Hagan .................. 246/240
1,889,022 11/1932 Little ........................ 246/240
2,986,630 5/1961 Maynard ................... 246/240

*Primary Examiner*—Arthur L. La Point
*Assistant Examiner*—George H. Libman
*Attorneys*—Forest B. Hitchcock, Jeremiah J. Duggan and Harold S. Wynn ABSTRACT: An improved switch machine having a manually operated mechanism for moving a set of switch points between two predetermined positions, the improvement providing automatic power control including; a starter circuit for activating the power control, a driving means for operating the mechanism, a stopping means for limiting the motion of the driving means signal means responsive to the stopping means for producing a signal when the driving means is stopped at a predetermined position, a timer for detecting an excessive time for moving the switch points and providing an electrical signal if an excess time duration is detected, a controller for relaying commands to the driving means and a decoupler for disconnecting the driving means from the controller.

The driving means responsive to the controller is activated by the starter circuit, deactivated in response to the stopping means signal and decoupler respectively, and reversed upon receipt of an excess duration indication from the timer.

An agreement detector is incorporated for checking the position of specific component parts with respect to the others.

INVENTOR
C. L. SWANTON

BY Forest B. Hitchcock
his ATTORNEY

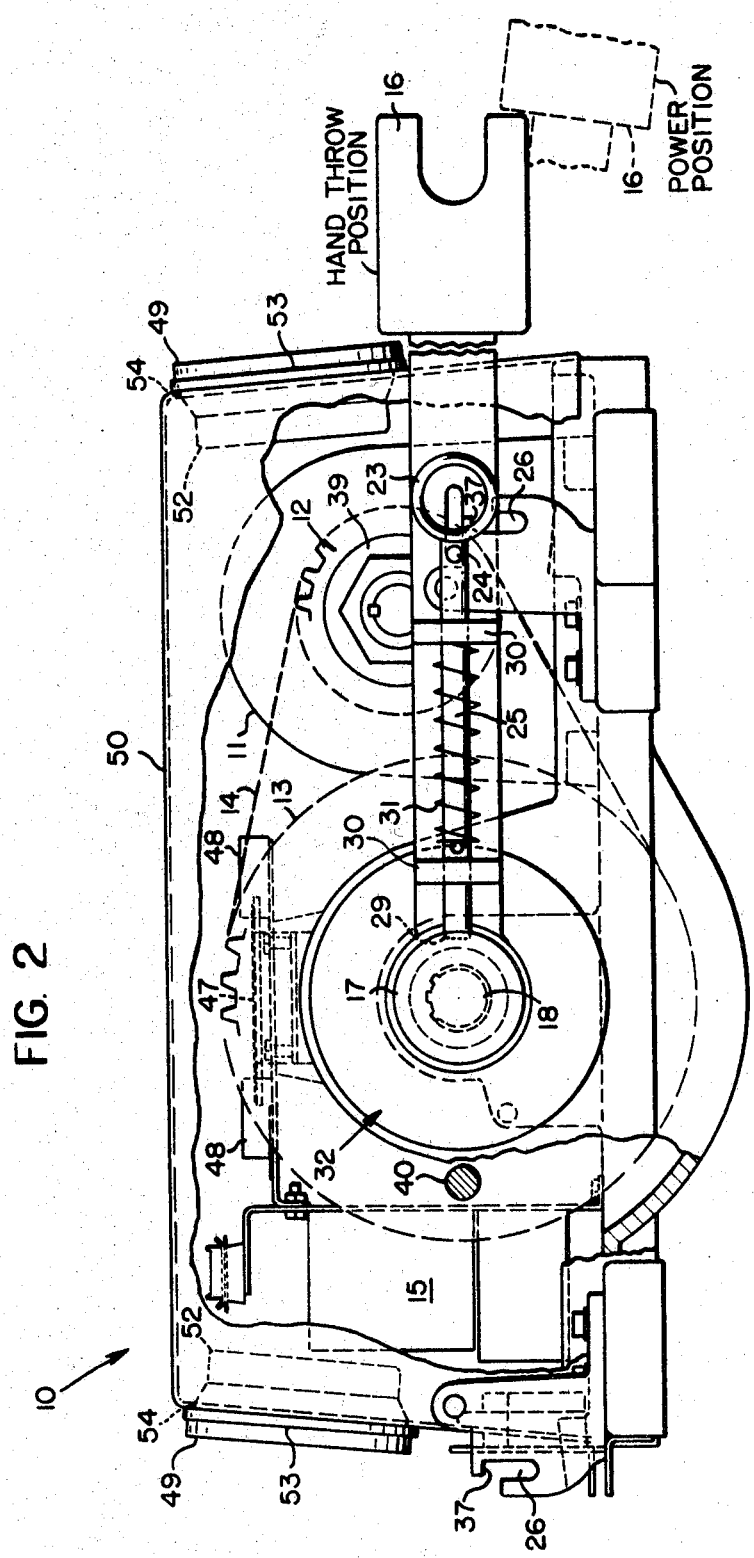

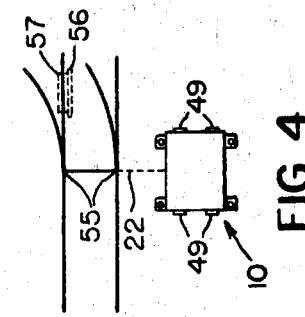
FIG. 4
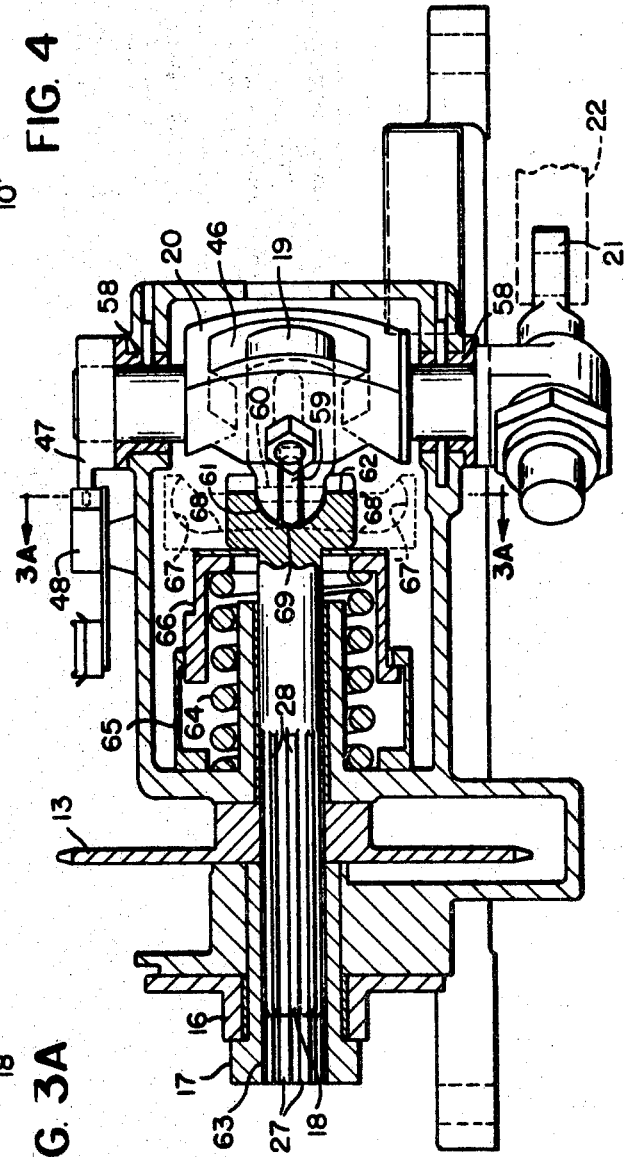
FIG. 3
FIG. 3A
INVENTOR
C. L. SWANTON

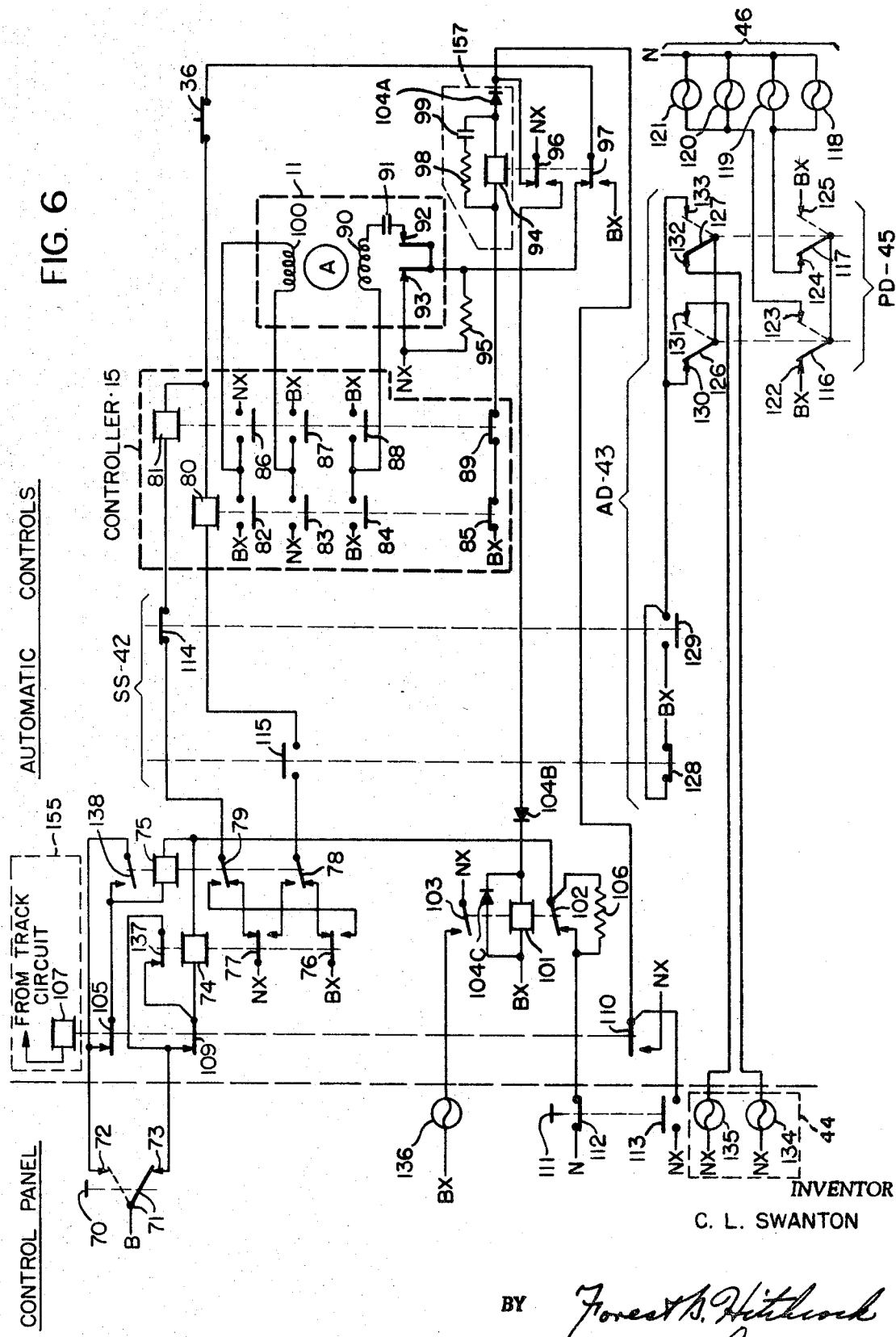

TRAILABLE SWITCH MACHINE WITH DUAL CONTROL

BACKGROUND OF THE INVENTION

The application relates to switch machines and in particular to an improved manually operated machine incorporating automatic control.

In flat or gravity type classification yards, mines, or industrial yards a fast efficient, compact, reliable and low cost switch machine is much in demand. Generally, prior art machines are many times slow in operation, rather bulky and require the installation of peripheral equipment such as wayside switch point indicators. In the event high speed is required, cost increases proportionally. It is further difficult in many instances to include desirable circuitry such as that providing quick mid-stroke reverse of switch position, and protection of the machine from damage due to jamming.

In a typical track layout it is possible for an object such as a lump of coal, stone or ice to block the switch points. In that event there is a possibility of damage to the machine. The power drive might over load and linkages inside the machine could be destroyed by forcing. It is essential therefore to have a means for detecting this situation and provide for a change to a more stable mode.

The transition from power to a manual operation is a source of great danger to crew men who must operate the switch. If the power is not decoupled properly there is a possibility of injury due to undesired movement of the machine mechanism.

Another problem which is necessary to overcome is the prevention of switch point movement while a car is over the switch. Once a car is detected the switch position should not be changed inadvertently.

It is also desirable to know in what mode the switch is in. This can be accomplished by an apparatus linked into the mechanism of the machine for detecting the position of certain parts of the device which parts should be in predetermined positions relative to the switch points. In addition, if the mechanism of the machine is not properly coacting, it is desirable to sense this condition and indicate a warning to either the trainman or yard operator.

It is therefore an object of this invention to provide an arrangement which substantially obviates one or more of the limitations and disadvantages of the described prior arrangements.

It is another object of the present invention to provide a power driven switch machine with dual control.

SUMMARY OF THE INVENTION

In accordance with the present invention there is provided an improved switch machine whereby a set of switch points which are moved between two predetermined positions by a manual lever acting through a primary and secondary shaft. The improvement provides for automatic control. A driving means for operating the primary shaft is included. A starter circuit, and a stopping means are provided acting through a controller for activating and deactivating the driving means respectively. A timer is included for checking if an excess time duration elapses for moving the switch points from one position to the other and indicates an excess time by a signal which precipitates a reversal of the driving means operation through the controller. A point detector is included for providing an indication of switch point position; a decoupler is included for disconnecting the driving means from the controller for safe manual operation. A circuit is also provided for checking the position of certain critical parts in the machine with respect to each other.

For a better understanding of the present invention together with other and further objects thereof, reference is had to the following description, taken in connection with the accompanying drawings.

BRIEF DESCRIPTION OF THE DRAWINGS

FIG. 2 is a front elevation of FIG. 1 with a segment of the cover removed;

FIG. 3 is a sectional side elevation of FIG. 1;

FIG. 3A is a sectional view of FIG. 3 along line 3A-3A.

FIG. 4 is a schematic plan view of the switch machine connected to the switch points;

FIG. 6 is a schematic circuit diagram of the controls of FIG. 5.

DESCRIPTION OF THE R PREFERRED EMBODIMENT

Figure 1:
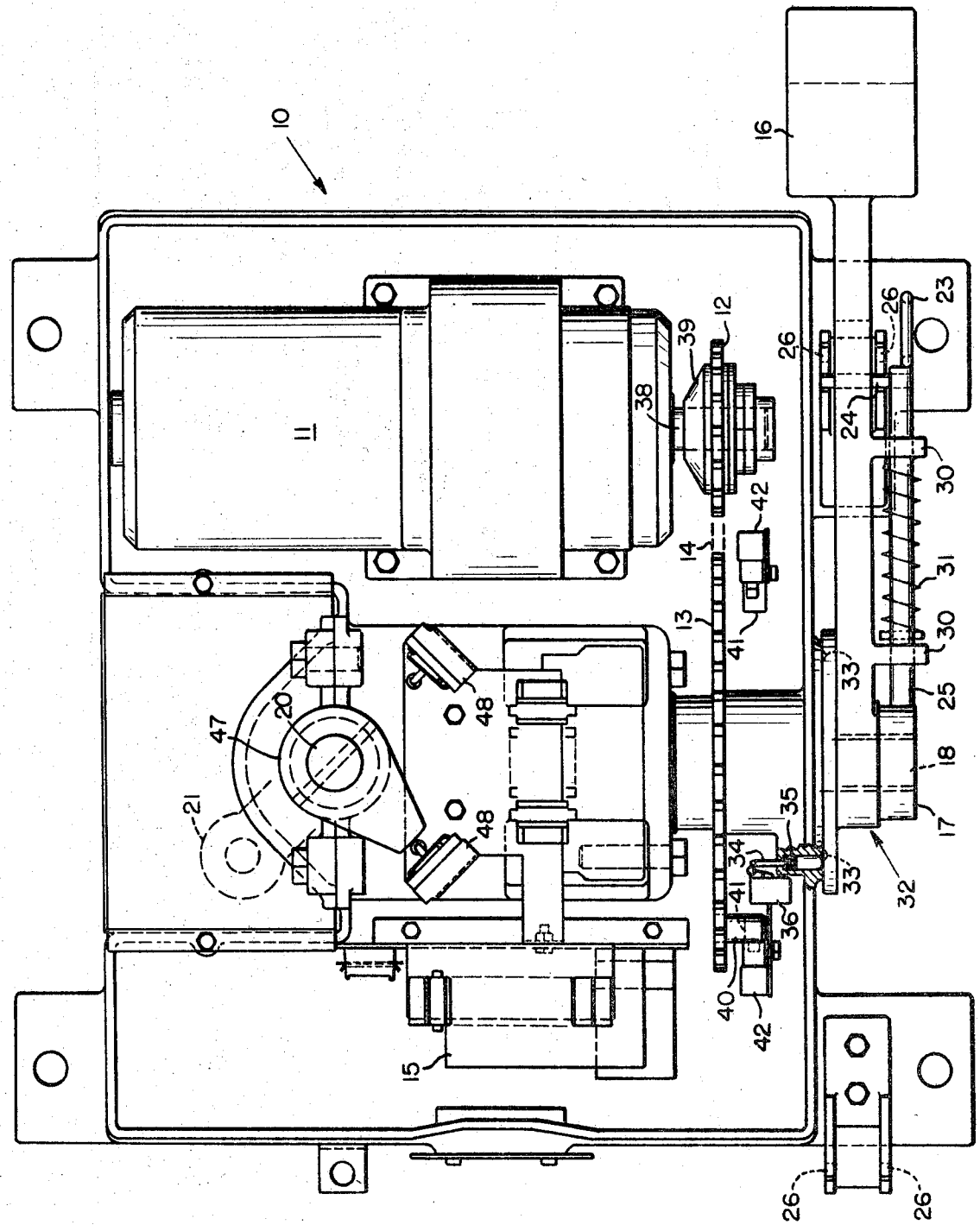
FIG. 1 is a top elevation of the preferred embodiment of the invention with the cover removed.

The preferred embodiment is shown described with reference to the drawings.

The device includes a standard type trailable switch stand 10, to which is added an electric motor 11, primary and secondary sprockets 12 and 13 respectively, chain drive 14 linking the primary and secondary sprockets and an electric controller 15 shown schematically in FIG. 6.

The switch points 55 are driven by a manual lever 16, connected to and operating a sleeve 17, inside of which is a horizontal shaft 18. A coupler 19 driven by horizontal shaft 18, operates a vertical shaft 20 actuating eye bolt 21 and moving throw-rod 22 which is connected to the switch points 55. When manual operation of the device is desired the manual lever 16 is in the hand-throw position as indicated in FIG. 2. Latch ring 23 and latch pin 24 are connected to a latch bar 25. The latch pin 24 fits into slot 26 and the latch bar 25 is mounted to the manual lever 16 for mechanically engaging and disengaging lever 16 from sleeve 17. The sleeve 17 has internal splines 27 and horizontal shaft 18 has external splines 28 for radially locking the sleeve 17 to the horizontal shaft 18. The sleeve 18 has a notch 29 for receiving latch bar 25. The latch bar 25 is arranged to ride laterally in brackets 30. A spring 31 biases the latch bar in a direction towards the sleeve 17. When the lever 16 is in the hand-throw position, the latch bar 25 fits into the notch 29 and locks the manual lever 16 into the switch stand mechanism 10.

The hub end 32 of the lever 16 has two indentations 33 as shown in FIG. 1. The indentations 33 are aligned with a plunger 34 biased by spring 35 controlling microswitch 36. When the lever 16 is in the hand-throw position shown in FIG. 2, the plunger 34 is located in one of the indentations 33 and opens microswitch 36 which is serially connected to controller 15. In order to activate the power control, the manual lever 16 must be decoupled mechanically from sleeve 17 and electrically by means of switch plunger 34, open circuiting microswitch 36. This is accomplished by pulling latch bar 25 out of notch 29 and hooking latch pin 24 into either of the latch slots 26. When the latch pin 24 rests at the bottom of the slot 26 then and only then will plunger 34 be able to slip into one of the indentations 33, closing microswitch 36 and allowing power to be transmitted to motor 11 through controller 15.

It can be noticed from FIG. 2 that the latch ring 23, latch pin 24 and latch slots 26 operate as a safety device to insure that power is cut off from the motor 11. Ledges 37 at the top of each latch slot 26 prevent the manual lever 16 from bouncing out of the latch slot 26 and inadvertently being mechanically coupled to the sleeve 17. In addition, if manual operation is desired, crew men would be required to lift the lever 16 up to the ledge 37, which by that slight motion would dislocate plunger 34 and cut off motor 11's power, however, the crew men must then pull the latch ring 23, pin 24 combination to the right (as shown) before the lever 16 can be lifted out of the slot 26. This operation was intentionally incorporated as a delay factor in the power to manual control transition so that the power controller 15 could not be accidentally tripped and possibly cause the lever to be whipped around, which might injure the crew man.

With the lever 16 in the power position and disengaged from the switch mechanism, the automatic controls can be readily operated. The motor 11 has an output shaft 38 to which clutch 39 is mounted. Primary sprocket 12 is attached to clutch 39 for connection with secondary sprocket 13 through chain 14. A stop pin 40 is attached to and protruding from sprocket 13. Stop ledges 41 are placed as shown on opposite sides of and at equal distances from the center of sprocket 13, limiting the motion of the stop pin 40. Stop switches 42 are mounted adjacent to stop ledges 41 and are open circuited when stop pin 40 engages either of the stop switches 42 a signal means at the end of its stroke. The stop switches 42 when opened circuited, cut off power to the motor 11 through the electromechanical controller 15. The stop switches 42 also include contacts for connection with an agreement detector 43 and indicator 44 shown schematically in FIG. 5.

Figure 5:
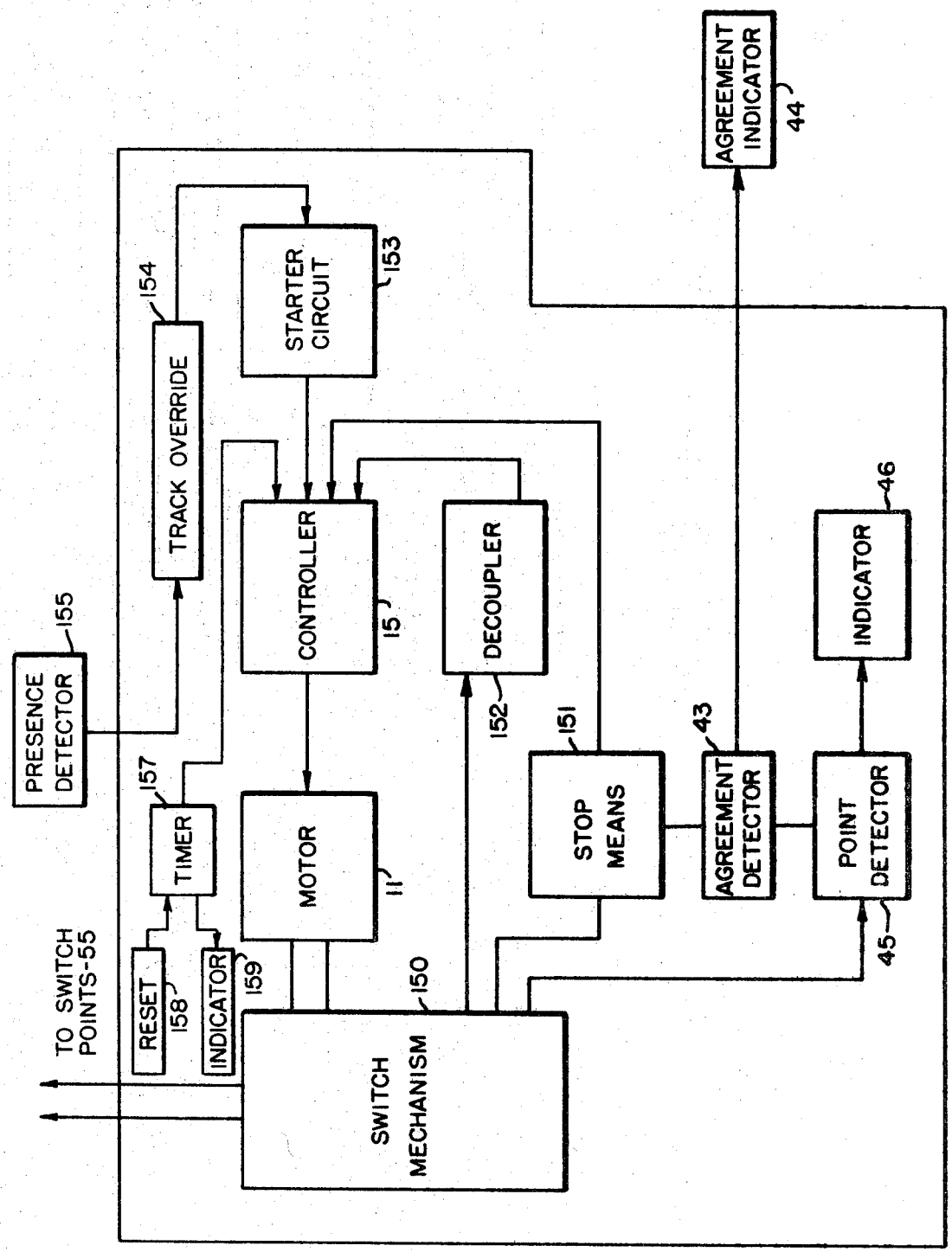
FIG. 5 is a block diagram of the power control and indication configuration.

A switch point detector 45 and indicator 46 of FIG. 5 are included in the device and their operation is described with reference to FIG. 1. A cam 47 is mounted to vertical shaft 20 and is turned as vertical shaft 20 rotates when the mechanism is operating. The cam traces out an approximately 90°$\Phi$arc and detector switches 48 are placed as shown at the extremes of cam 47's motion. Indicator lights 49 shown in FIG. 4 are connected to the detector switches 48 and indicate by the usual color code the position of switch points 55.

The detector switches 48 have internal contacts which link with stop switches 42 together comprising the agreement detector 43 connected to indicator 49 so that the operator can have a check on switch position, or perhaps instead of visual indication, controller relays may be incorporated which would cut off power to the motor 11. In addition, if programmed operation were desired, the connections provide for suitable interface with a computer input.

A feature incorporated into the device which provides for ease of maintenance and reduction of the number of wayside devices is the housing cover design 50. The cover 50 is a deep-sided box as shown in FIG. 2 and when removed allows the interior of the housing 10 to be easily accessible. In addition, indicator lamps 49 are mounted directly into the cover 50. The lamps 49 are a molded flexible rubber cup 52 with a colored roundel 53 mounted therein and the whole device snaps into holes 54 provided in the cover 50, eliminating the necessity for additional wayside signal lights and external wiring.

The trailable feature of the device is exhibited with reference to FIGS. 3, 3A and 4. This type of switch was chosen to be adapted to dual control, because it is useful in the application for which the switch machine is desired, i.e., classification yards, industrial and mining yards. It is helpful to describe the mechanism by which trailing is accomplished in order to have a complete understanding of the device in view of the improvements therein.

As the switch is trailed, the switch points 55 are pushed out of position by the flange 57 of a railroad car wheel 57 wedging open the switch points 55. The motion of the points 55 pushes or pulls eye bolt 21 through throw-rod 22 depending on the position of the switch when trailed and in turn the motion of eye bolt 21 rotates vertical shaft 20 in its mountings 58. As vertical shaft 20 rotates, coupler 19 moves laterally. Roller 59 connected to coupler 19 through pin 60 fits into and rolls in slot 61 in the head 62 of horizontal shaft 18. Horizontal shaft 18 is mounted in shaftway 63 and is biased against the roller 59, coupler 19 assembly by spring 64, mounted between a fixed main spring bracket 65 and laterally movable seat 66. As the vertical shaft 20 is rotated, coupler 19 moves laterally and roller 59 moving in slot 61 pushes horizontal shaft 18 away from its biased direction. Horizontal shaft 18 is permitted to move laterally through splines 27 in sprocket 13 and sleeve 17.

The slot 61 in the head 62 of horizontal shaft 18 has extreme positions 67 and 67' and slight inclines 68 and 68'$\Phi$to a peak 69. As the roller 59 moves along incline 68 and reaches peak 69, it quickly snaps over the peak 69 into down incline 68', the opposite extreme 67' in slot 61. This toggling action permits the switch to be trailed without damage to the points 55 or the machine 10.

Turning to FIG. 5, a functional block diagram of power control and indication is shown. Switch mechanism 150 is driven by motor 11, which receives electrical power for starting and running from controller 15. The controller 15 receives its commander from stop means 151, hand lever controlled decoupler 152, the operation of which was previously described, and starter 153. The starter 153 is constrained by track override control 154. Point detector 45 senses when the switch points 55 are in each of their normal or reverse positions and transmits a signal to point indicator 46. In addition, contacts on stop means 151 and point detector 45 are connected to each other, forming an agreement detector 43 and are in turn connected to agreement indicator 43. Presence detector 155 senses whether a train is over or in the vicinity of the switch points 55 and sends a signal to that effect to track control 154. The track override controller 154 prevents starter 153 from being effective in changing the mode of operation of the switch when track override control 154 receives a signal from presence detector 155. Timer 157 detects the time duration for one stroke of the switching cycle and if the duration is beyond a predetermined setting, the timer causes the controller 15 in conjunction with starter circuit 153 to initiate a reverse command to motor 11. Indicator 159 relays this information to the switch operator and reset 158 is activated by the operator to permit the timer to be properly synchronized with the controller 15.

The operation of the electrical controls of FIG. 5 is described with reference to FIG. 6. The circuit shown is drawn to show all the components in their normal positions. All AC voltages are represented by BX and NX for instantaneous positive and negative values respectively, while B and N represent positive and negative DC values. A description of the component parts and their function are presented followed by a typical operating sequence incorporating their various functions.

The machine is activated by depressing sequence position button 70 which controls contactor 71. The sequence push button 70 is the type which switches contactor 71 between contact points 72 and 73 alternately each time it is depressed. Relays 74 and 75 connected to contacts 72 and 73 respectively similarly receive DC energy by switching of contactor 71. Contacts 76, 77 and 78, 79 are controlled by relays 74 and 75 respectively, and deliver current to controller 15 in the proper polarity.

The controller 15 includes relays 80 and 81 which in turn control contacts 83 through 85, and 86 through 89, respectively. Contacts 82, 83 and 86, 87 alternately control running coil 100 of motor 11 for turning armature. A. Contacts 84 and 88 alternately control starter coil 90 of motor 11 which is connected in series with phase shifting capacitor 91 and centrifugal motor switches 92 and 93. Resistor 95 shunts centrifugal switch 93 and is included to assist in the quick reversal procedure.

Contacts 85 and 89 control timer 157 shown in FIG. 5 by alternately open circuiting the power source to relay 94 when their respective relays are energized. Relay 94 controls contacts 96 and 97. Contact 97 through its front contact and microswitch 36 completes the circuit for relays 80 and 81. Relay 94 is provided with a slow release feature by means of resistor 98 and capacitor 99 connected across the terminals of relay 94 while diode 104A is included, allowing AC operation of relay 94.

The back contact of 96 controls relay 101. Contact 102 controlled by relay 101 shunts resistor 106 which is incorporated to provide for automatic latch-out of the sequence control 70 for relays 74 and 75. Contact 103 also controlled by relay 101 completes the circuit for lamp 136; a lamp which has for its purpose to indicate when timer 157 has been activated. Diodes 104B and 104C are connected to provide for AC operation of relay 101.

Presence detector 155 includes relay 107 and its associated track circuit (not shown) and the relay 107 drops away when the presence of a train is detected at or in the vicinity of the switch points 55. Relay 107 controls contacts 105, 109 and 110. When a train is detected in the vicinity of the track circuit controlling relay 107, contacts 108 and 109 drop away and no command from sequence pushbutton 70 can be transmitted to relays 74 and 75. Contact 110 dropping away in that situation and will automatically reset relay 94 in the energized position.

Pushbutton 111 controls normally closed switch 112 and normally opened switch 113. With switch 113 closed, relay 94 is manually reset. The depressing of 111 also opens switch 112 which deenergizes the circuit leading to relays 74 and 75 so that no change in command can occur while relay 94 is being reset.

Switches 114 and 115 are contained in stop switch 42 of FIG. 2. They are of the normally closed type and as stop pin 36 arrives at either of the stop ledges 41 one of the switches 114 or 115 will be open circuited deenergizing relays 81 or 80 respectively. When relays 74 and 75 are in correspondence with controller 15, both relays 80 and 81 will be deenergized, and one of the contacts 114 or 115 is closed and ready to provide energy to its respective relay 81 or 80 when pushbutton 70 is depressed, changing the command to relays 74 and 75. When the machine is at rest at the stop position, switches 114 and 115 will provide an energy path for one of the relays 81 and 80 respectively. Contacts 116 and 117 included in point detector 45 of FIG. 5 are controlled by cam 40. Contacts 116 and 117 contained in point detector switches 48 and activated by cam 47 control lamps 118 through 121 by contact points 122 through 125 which give indication of the position of the switch at the wayside. Contacts 128 and 129 are included in stop switch 42 while contacts 126 and 127 controlling contacts 130 through 133 are included in point detector switches 48 and taken together form the agreement detector 43. Indicator lamps 134 and 135 form the agreement indicator 46. If cam 47 is at either of its extreme positions and stop pin 40 is at a corresponding stop ledge 41, one of the lamps 134 and 135 shall be lit.

Latch switch 36 decouples relays 80 and 81 by the means previously discussed so that manual operation can be accomplished safely.

Contacts 137 and 138 controlled by relays 74 and 75 respectively are included in track override 154 to keep either of relays 74 and 75 energized in the event that track relay 107 is dropped away by an approaching train. If the switch machine is in midstroke, and a train simultaneously enters the track circuit deenergizing relay 107, it is important to require the contacts controlled by relays 74 and 75 to continue to deliver power to controller 15 so that the stroke can be completed before the train travels over the switch.

Any emergency which warrants a quick change of command of switch position requires that the machine be able to change its direction at any time during its stroke. Assuming that the machine is operating from normal to reverse, the direction of the motor can be switched back to normal by depressing sequence pushbutton 70. This will restore relays 74 and 75 and their associated contacts to the positions shown. Switch 115 being normally closed while the machine is running, provides a path of energy for relay 80. However, relays 80 and 81 are mechanically interlocked and 80 cannot pick up until 81 drops away.

If motor 11 is a single phase induction motor and is running at rated speed, contacts 92 and 93 are open with coil 90 consequently having no effect in the motor 11—s operation. If the connection to coil 89 is quickly reversed the motor 11 will continue to operate in its direction of rotation. In order to prevent this, resistor 95 is included. With contact 93 open, resistor 95 is placed in series with either of relays 80 and 81 which ever happens to be energized whenever contact 93 is open circuited. The value of resistor 95 is another of the type such that the current passing through it is above the release value, but below the pickup value of the relays 80 and 81. When relay 81 is deenergized, relay 80 will not pick up until the motor 11 slows down sufficiently so that resistor 95 is shunted out of the circuit by the closing of centrifugal switch 93. The centrifugal switch 92 will also close at the same time as centrifugal switch 93 such that when relay 80 picks up both the running coil 89 and the starter coil 90 are energized simultaneously and that under these conditions the direction of rotation will be determined by the polarity of the running coil 89.

It is important to provide for reversal of the stroke in the event of switch point jamming. Slow release relay 94 incorporated into timer 157 is used for this purpose. The release time of relay 94 is determined by the value of resistor 98 and capacitor 99. The value is chosen to be slightly longer than the normal switching time. If a blockage of the switch points 55 occurs, relay 94 will drop, causing a reversal of the stroke, back contact 97 changes the polarity of relays 80 and 81 and since a blockage will cause the clutch 39 to slip, a considerable load is placed on the motor. The speed of the motor is therefore reduced to such an extent that the reason for the use of resistor 95 no longer exists and quick restoration proceeds automatically with the mere change of polarity of coil 89.

Relay 101 energized by back contact 96 or relay 94 causes indicator 136 to be lit through contact 103. This will warn the operator of the machine that timer 157 has called for a reverse command and the controls cannot be operated until relay 94 in timer 157 is reset by depressing pushbutton 111 closing switch 113. In addition, as relay 101 is energized, the shunt of resistor 106 by contact 102 is removed placing resistor 106 in series with either of relays 74 and 75, which ever happens to be energized. The value of resistor 106 is such that the current passing through is above the release value of the relays 74 and 75 but below their pickup values. This prevents any command from pushbutton 70 from having any effect on the machine controls.

In the foregoing description an improved dual control switch machine control system has been described. A device which will provide for swift shifting of switch points, safe transition from power to manual control, trailability, self-contained switch point detection, agreement detection, external override for prevention of switching when a car is over the switch, mechanical torque limiting and overload protection, caused by mechanical jamming, and automatic reversal in the event of switch blockage. The combination of these features and other previously mentioned features, provides for an improved and simplified device.

While there has been shown what at present is considered to be the preferred embodiment of the invention, it will be obvious to those skilled in the are art that various changes and modifications may be made therein without departing from the true spirit and scope of the invention.

I claim:

1. An improved switch machine wherein a set of railroad switch points are moved between two predetermined positions by a secondary shaft mounted in the switch machine housing, housing, the secondary shaft being activated by a manual lever through a primary shaft having two stop positions, the improvement providing automatic power control comprising:
   electrically actuated means mounted to the switch machine for driving the primary shaft between the two stop positions;
   a controller coupled to the driving means for providing electrical control signals thereto;
   a starter circuit governing the controller for providing initial actuation thereto;
   stopping means mounted to the housing for stopping the primary shaft;
   signal means responsive to the engagement of the stopping means and the primary shaft for providing an electrical signal to the controller when the primary shaft is in a stop position;
   a timer responsive to the controller for checking the duration of time for moving the switch points from one predetermined position to the other, and producing an electrical signal when a predetermined time is detected;

a decoupler controlled by the manual lever, for electrically coupling the driving means and the controller;

a point detector connected to the secondary shaft for detecting when the switch points are in the predetermined position;

an agreement detector responsive to the point detector and the stopping means for checking agreement of the stopping means signal and the point detector; and the controller responsive for, activating the driving means in accordance with the initial actuation of the starter circuit, deactivating the driving means in response to the electrical signal of the stopping means and open circuited decoupler respectively, and reversing the driving means in response to the timer signal.

2. The improved switch machine of claim 1 wherein the means for driving the primary shaft comprises a motor mounted to the switch machine housing and electrically connected to the controller a slip clutch mounted to the output shaft of the motor and a sprocket drive means connected between the slip clutch and the primary shaft.

3. The improved switch machine of claim 2 wherein the stopping means comprises a pin rigidly mounted to the primary shaft two stop members mounted to the switch machine housing for receiving the pin and limiting the motion of the primary shaft.

4. The improved switch machine of claim 3 wherein the decoupler comprises a switch, mounted to the housing and electrically connected to the controller for activating the deactivating the motor a spring biased plunger, mounted to the housing for activating and deactivating the switch and the manual lever having two indentations for receiving the plunger. The plunger activates the switch when in the indentations, and deactivates the switch when dislocated from the indentations.

5. The improved switch machine of claim 4 wherein the point detector connected to the secondary shaft for determining the position of the switch points comprises:
  a cam member rigidly mounted to the secondary shaft and rotating synchronously with the secondary shaft;
  two rest positions defined by the end points of the cam rotation;
  an electrical point detector switch, mounted to the housing at each of the rest positions and activated by the cam member, as the cam member is at each rest position; and
  a plurality of indicator lamps, mounted to the machine housing, the indicator lamps are electrically connected to the point detector switches and are lighted in a predetermined array.

6. The improved switch machine of claim 5 wherein the agreement detector comprises a first switch mounted to the housing adjacent to each of the stop switches and activated by the stop pin simultaneously with the corresponding stop switch a second switch mounted to the housing adjacent to each of the point detector switches and serially connected to the first switch and activated by the cam member simultaneously with the corresponding point detector switch; and means for indicating that the first and second switches are activated.

7. The improved switch machine of claim 6 wherein the controller comprises two interlocked relay coils three sets of contacts controlled by each of the relay coils the first set of contacts for starting the motor; the second set of contacts for continuous running of the motor and the third set of contacts connected to the timer.

8. The improved switch machine of claim 7 wherein the starter circuit comprises two starter relays a switch energizing the starter relays alternately a plurality of contacts controlled by the relays for delivering current to the controller in a predetermined polarity.

9. The improved switch machine of claim 8 wherein the timer comprises:
  a slow release relay having a release time of predetermined value greater than the time for moving the switch points from one position to the other;
  a plurality of contacts controlled by the slow release relay;
  one terminal of the slow release relay responsive to the third set of contacts in the controller;
  the other terminal of the slow release relay connected to one of its front contacts for sticking;
  one of the contacts of the slow release relay connected to the controller relay coils for changing the polarity of the controller relay coils between its front and back contacts; and
  a time indicator connected to the back contact of one of the contacts of the slow release relay.

10. The improved switch machine of claim 9 wherein the timer indicator comprises a relay periodically energized by one of the back contacts of the slow release relay a plurality of contacts, controlled by the relay a lamp connected to a front contact of the relay for showing when the slow release relay is deenergized a resistor, serially connected to the starter relays; a back contact of the relay, shunting the resistor and periodically introducing the resistor in series with the starter relays when the relay is energized.

11. The switch machine of claim 3 wherein the signal means includes an electrical stop switch mounted adjacent to each of the stop members and activated for providing the electrical signal when the stop member receives the stop pin and wherein the controller is responsive to the stop switches for deactivating the driving means; and the agreement detector is responsive to the stop switches for detecting the position of the pin.